United States Patent Office 3,430,689
Patented Mar. 4, 1969

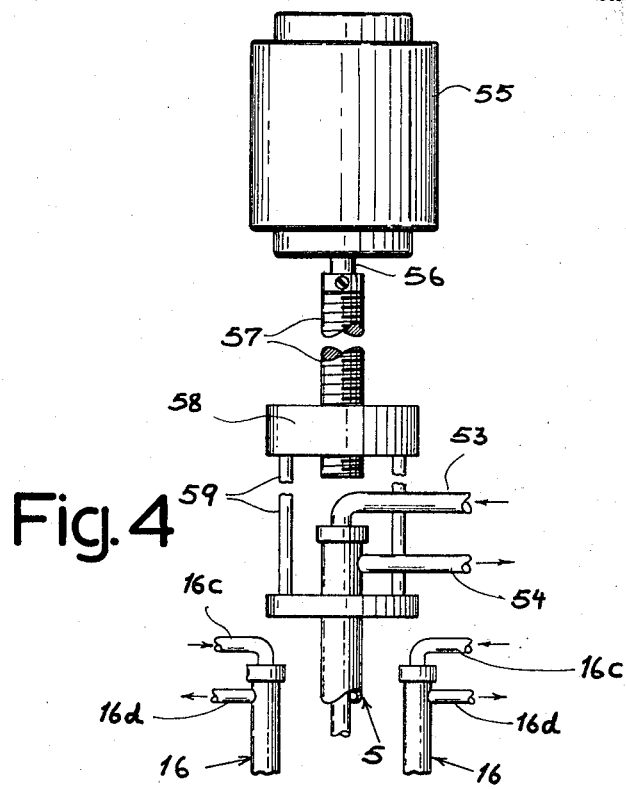
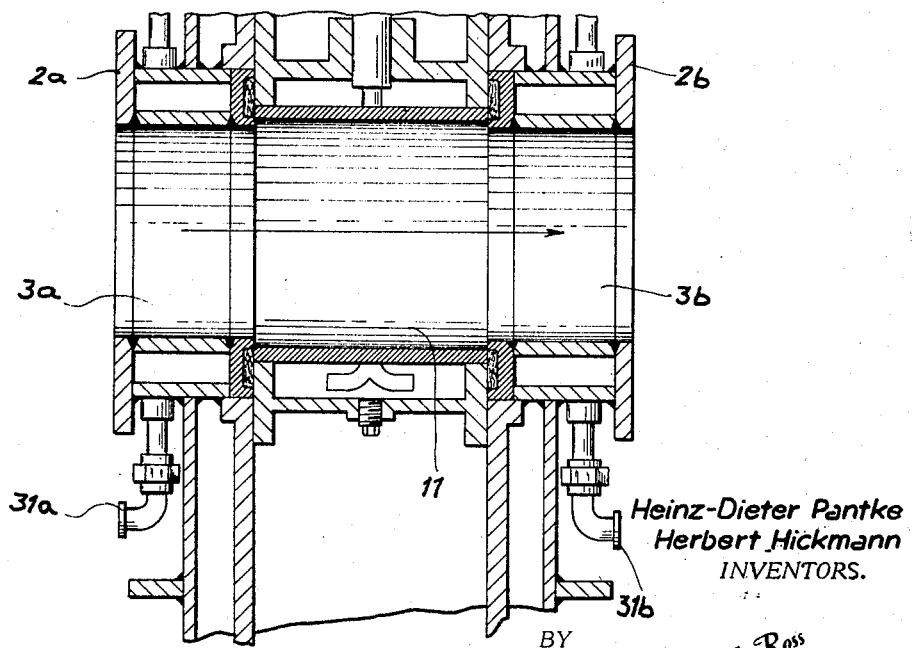
Fig. 4
Fig. 2

3,430,689
FLUID-CONTROL MEMBER
Heinz-Dieter Pantke, Essen-Frintrop, and Herbert Hickmann, Oberhausen, Rhineland, Germany, assignors to Huttenwerk Oberhausen AG, Oberhausen, Germany, a corporation of Germany
Filed Sept. 20, 1967, Ser. No. 669,173
Claims priority, application Germany, Sept. 27, 1966, H 60,599
U.S. Cl. 165—47                10 Claims
Int. Cl. F24h 3/00

ABSTRACT OF THE DISCLOSURE

A valve for the selective blocking and throughflow of hot gas wherein a cage is linearly shiftable in an elongated housing having a pair of aligned ports connectable in a hot-gas line, the cage being provided with a pair of hollow closure plates alignable with the ports in one position of the cage and adapted to be cammed outwardly upon movement into this position by a wedge arrangement so that the plates engage the valve body around the ports; coaxial tubes extend in the direction of movement of the cage and are slidable in the valve body for circulating water or other cooling liquid through the interiors of these plates, while permitting the transverse displacement thereof by inherent resiliency of the tubes which are rigid with the plates. The cage also carries a cylindrical duct communicating between the ports in another position of the cage and defining therein a water jacket with which another linearly extending pair of coaxial pipes communicates and serves as a stem for shifting the cage; a pair of spring-biased guide plates bears transversely and resiliently against the slidable cage along the sides thereof confronting the ports.

---

The present invention relates to a fluid-control member and, more particularly, to a valve for the selective blocking and throughflow of hot gases of the type produced in a metallurgical plant or other furnace installation.

Slide valves for the selective blocking and unblocking of hot gases have generally comprised, heretofore, gates which are movable in an elongated valve body under the control of a linearly extending member or stem affixed to these plates; the latter are designed to unblock or block a fluid passage through the interior of the valve body between a pair of ports. In such systems, it has been proposed to provide means for urging the closure plate against the periphery of the ports in a direction transverse to the direction of sliding movement for the valve-opening or valve-closing operation and thereby achieve a more effective seal during valve closure. Such arrangements have not proved to be fully satisfactory for systems in which the gases are elevated temperatures of a nature resulting in distortion of the plates, their guides and even the valve body. To avoid these difficulties, it has been necessary to provide complex means for cooling the valve which have increased the fabrication costs and, in many cases, were not sufficiently able to overcome these disadvantages.

It is, therefore, the principal object of the present invention to provide an improved valve structure for the control of hot gases which is not affected by high temperatures, manifests reduced wear by comparison with earlier systems, is of relatively simple and inexpensive construction, and provides an effective closure without the tendency to distortion adversely affecting prior-art valve systems.

These objects and others which will become apparent hereinafter are attained in a valve structure comprising an elongated (e.g. upright) valve body or housing having a pair of axially aligned ports serving as inlet and outlet for the hot gases, respectively, whose axis extends transversely to the major dimension of the valve housing; the latter slidably receives a linearly shiftable cage which is guided in the housing between the ports by a pair of spring-biased guide elements bearing upon the cage or slider so as to strip from the latter any decomposition residues, scale or the like which normally adhere to the movable member of hot-gas valves. According to the principal feature of this invention, the slider or cage carries a pair of closure plates confronting the respective ports in an operative position of the slider and of a diameter exceeding that of the ports so that these plates overhang the framing zones of the ports and sealingly engage the latter when the plates are shifted (within a limited play) transversely to the direction of movement of the slider in this operative position. The closure plates are hollow and are provided with respective conduits extending in the direction of movement of the slider and mounted in the valve body or housing at a location remote from this slider for circulating a cooling fluid (e.g. water) through the plates while accommodating the sliding motion of the slider to whose closure plates they are rigidly attached. To this end, the valve body may be provided with a cover plate having packing or other sealing arrangements held tightly against the conduits by respective packing nuts, but slidably accommodating these conduits which move with the slider and are transversely deflectable without plastic deformation to accommodate the movement of the closure plates transversely to the conduits and into sealing engagement with the housing about these ports.

The conduits each may be formed from a pair of coaxial tubes, one of which is anchored to the respective plate while the other extends into the chamber formed therein to circulate the cooling liquid through this chamber by feeding it in through one of these tubes and withdrawing the fluid through the other. The camming means for transversely displacing the plates into sealing engagement with the housing around the inlet and outlet ports advantageously comprises wedges carried by the plates and engageable, when the slider is shifted into the aforementioned operative position, with a camming member mounted upon the valve housing.

This slider is, according to a more specific feature of this invention, shiftable by a stem which constitutes a further conduit communicating with a cooling jacket or chamber formed about a transversely extending passage of the slider alignable with the port in the other operative position of the slider to permit throughflow of gases between these ports. In the upright condition of the valve structure, the stem is vertically shiftable and is formed of coaxial tubes, one of which reaches to the bottom of the latter chamber below the passage, while the other terminates in the chamber above the passage, to ensure thorough circulation of the cooling liquid. The stem also passes through the cover of the valve housing where it is sealingly but slidably retained via a packing nut and sealing sleeve as previously described. Any conventional type of actuating mechanism may be provided for linear displacement of the stem, e.g., an electric motor or hydraulic cylinder. Furthermore, the ports are framed along the flanks of the slider by a pair of guide elements in the form of plates which are urged against the slider by springs designed to cause rubbing of these plates against the walls of the cage and its closure plate in order to strip these surfaces from any accumulation of soot, scale or other contaminants.

This system has the advantage that the deflectable conduits are rigid with the closure plates but permit, without plastic deformation, the limited transverse movement or play necessary for effective sealing engagement of these plates with the annular seats surrounding the ports, while permitting effective cooling of the closure plates. These plates are drawn inwardly under the resilient action of the conduits and thus are held back from excessive frictional wear in engagement with the walls of the housing so that no sliding movement produces wear of these seats and their frequent replacement can be avoided.

The above and other objects, features and advantages of the present invention will become more readily apparent from the following description, reference being made to the accompanying drawing in which:

FIG. 2 is a cross sectional view of a portion of this valve with the slider shown in another operative position;

FIG. 4 is a diagrammatic elevational view illustrating the connections to the cooling conduits and the drive means.

Figure 1:
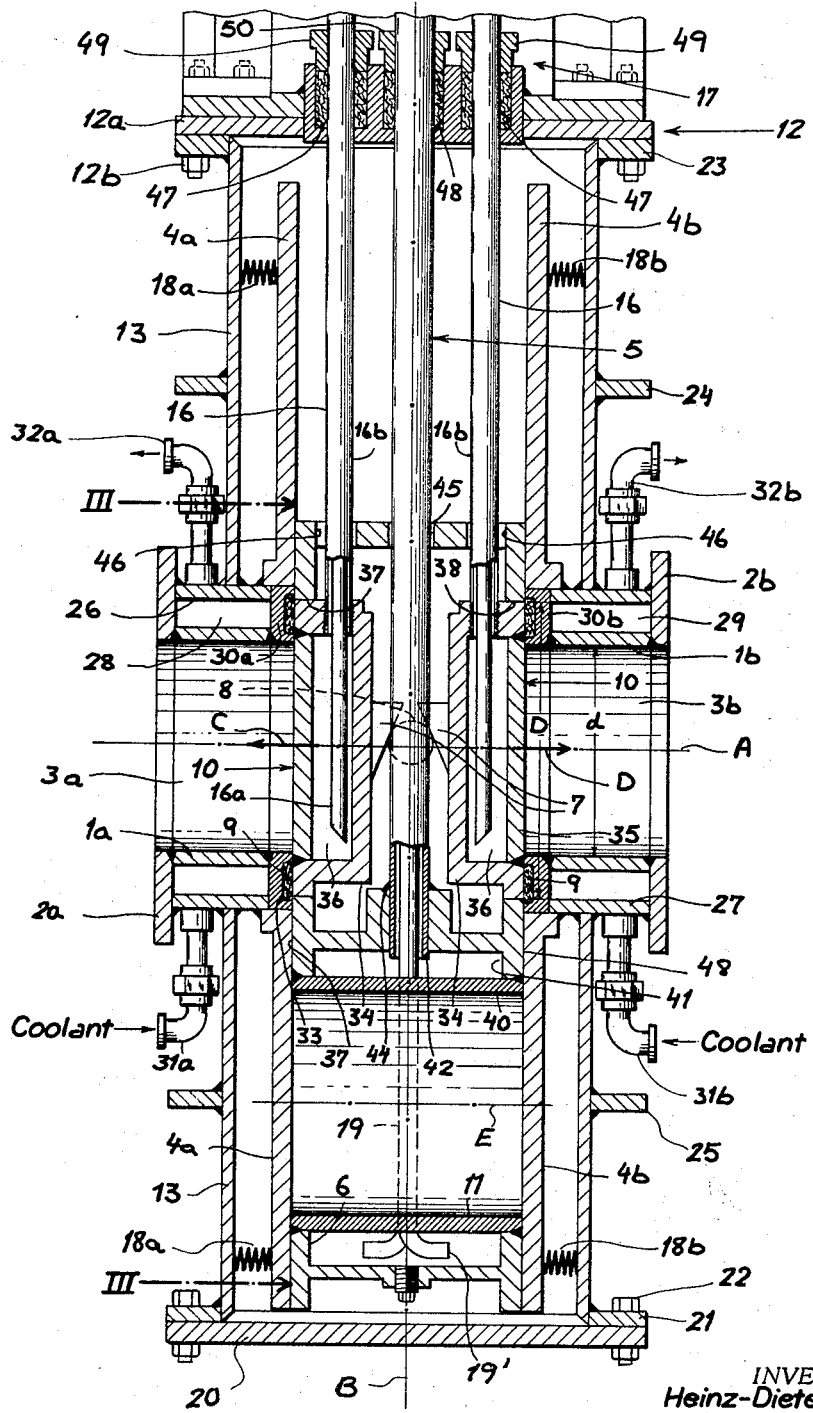
FIG. 1 is an axial cross sectional view of a valve for the control of hot gases according to this invention showing the slider in one operative position.
Figure 3:
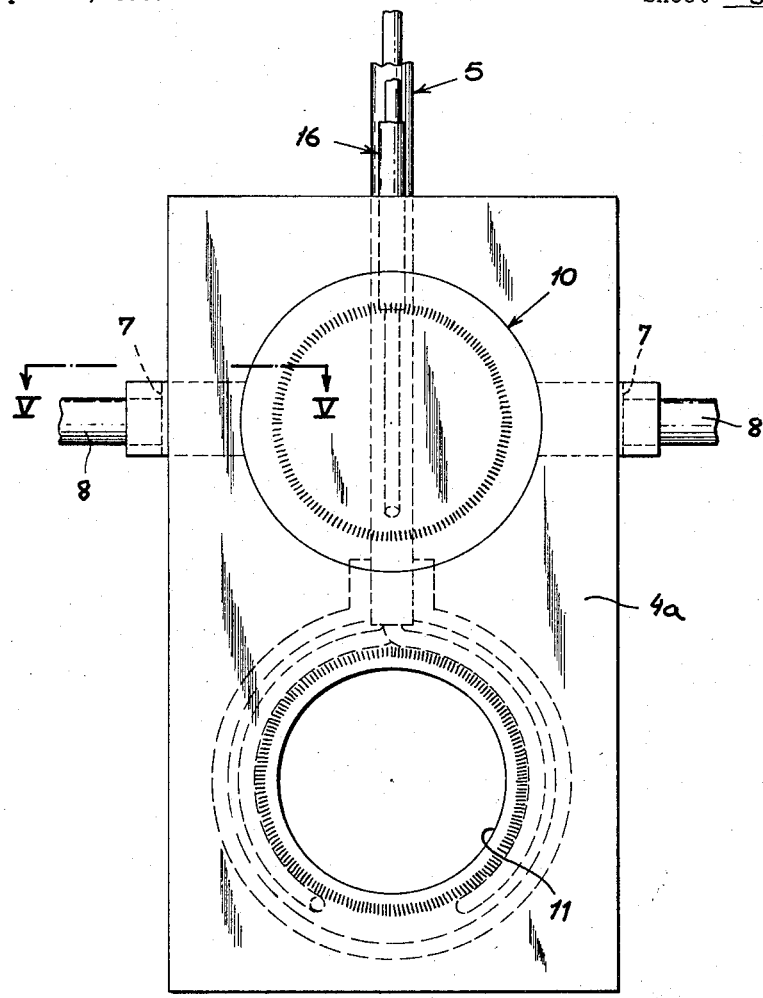
FIG. 3 is a view of the slider or cage taken generally along the line III—III of FIG. 1.

In the drawing there is shown a valve for the control of hot gases which comprises an upright sealed housing structure 13 forming a valve body which is closed at its lower end by a plate 20 bolted to a flange 21 at 22, this flange 21 being welded to the vertical walls of housing 13 at the base of the valve body. The valve body 13 may be water jacketed and is closed at its upper end by a cover 12 consisting of a plate 12a secured by bolts 12b to the lateral flange 23 of the housing, while reinforcing and cooling ribs are provided at 24 and 25 along the vertical wall of the housing. A pair of ports 3a and 3b are formed at diametrically opposite locations in the wall 13 of the housing and have a common axis A which is perpendicular to the vertical axis B of the housing. The ports 3a and 3b are defined by cylindrical walls 1a and 1b centered on this axis and form, with coaxial outer walls 26 and 27, annular cooling chambers 28 and 29 surrounding the ports 3a and 3b. Radial annular flanges 2a and 2b serve to connect the valve in a hot-gas line while an annular ring 30a, 30b frames each port 3a or 3b and is provided with an inwardly open annular recess forming a sealing seat 9 surrounding each port. A water inlet 31a, 31b communicates with chambers 28, 29 surrounding the inlet or outlet 3a or 3b while, at a diametrically opposite location, a water outlet 32a, 32b is provided. Thus the coolant can be circulated through the jackets surrounding the ports.

The valve structure also includes an axially (vertically) shiftable slider or cage 6 whose upper portion carries a pair of hollow closure plates 10; the plates are respectively alignable with the ports 3a and 3b in the lower operative position of the slider 6 shown in FIG. 1. The plates 10 have diameters D which exceed the diameters d of the ports 3a and 3b so that annular marginal portions 33 of these plates radially overhang the ports and are engageable with the seats 9 when the plates 10 are cammed outwardly as described in greater detail hereinafter. Each plate 10 consists of a dished member 34 welded to a disk 35 to define a coolant chamber 36 within the respective plate. The plates 10 are shiftable in the directions of arrows C and D, i.e. outwardly, with respect to the slider 6 which has surfaces 37 and 38 guiding the plates in this direction.

In the upper operative position of the slider 6 (FIG. 2), a passage 11 is axially aligned with the ports 3a and 3b to interconnect and permit fluid throughflow therebetween. The passage is formed by a cylindrical duct 40 whose axis E is perpendicular to the axis B and the direction of movement of the slider.

Around the duct 40, there is formed an annular chamber 41 constituting a water jacket with which a pair of tubes 19 communicate at their open extremities 19' below the duct 40. Above the duct, the outer tube 42 opens into this chamber and coaxially surrounds an inner member 43 communicating with the tubes 19. The coaxial tubes 42, 43 form an actuating member or stem 5 which is anchored at 44 to the cage 6 between the duct 40 and the plates 10, the stem extending upwardly through an aperture 45 in the upper end to the bore-like cage. The faces 47 and 48 on opposite sides of the cage 6 are slidably engageable by a pair of guide plates 4a and 4b which frame the ports 3a and 3b. The plates 4a and 4b are urged by springs 18a and 18b toward one another and flank the slider so as to maintain it free from accumulated contaminants and scale or soot deposits.

Figure 5:
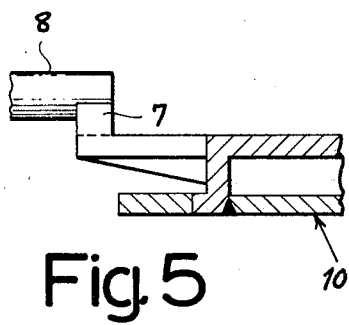
FIG. 5 is a cross sectional view taken generally along line V—V of FIG. 3.

Each of the hollow plates 10 is provided with a respective conduit 16 extending upwardly parallel to the axis B and formed by the outer tube 16b which is anchored to the plate 10 at the upper side of the chamber 36 and communicates therewith. Through the interior of the outer tube 16b, a coaxial inner tube 16a of the duct extends to deliver a coolant to the lower side of each chamber 36, the cooling liquid being withdrawn through the outer tube. The conduits 16 are resiliently deflectable in the directions of arrows C and D when the plates 10 are urged outwardly upon the engagement of their wedges 7 (see FIGS. 1 and 5) with pins 8 affixed to the wall 13 of the valve housing. A pair of downwardly convergent wedges 7 is provided on each of the plates 10 on opposite sides of the centrally extended stem 5 and for cooperation with respective transverse pin 8 forming a cam mechanism urging the closure plate 10 outwardly when the slider 6 is shifted downwardly from its position illustrated in FIG. 2 to the position shown in FIG. 1. When the slider 6 is raised, the wedges 7 disengage from the pins 8 and the plates 10 swing out of sealing engagement with the seat 9 under the bias of the resilient conduits 16 through the play of each plate 10. To permit deflection of the conduit 16 without plastic deformation, slots 46 are provided in the cage 6 at the point through which these conduits pass. At the cover 12 to the valve, the conduits 5 and 16 each pass through a respective sealing boss 47 or 48 containing a packing of graphitic or asphaltic character compressed against the conduit 5 or 16 by respective packing nuts 49 and 50 so as to permit sliding movement of these conduits while sealing them against passage of gases therearound. The interior of the housing 13 may also be provided with fittings for the passage of a coolant therethrough.

In FIG. 4 there is shown a system for supplying the coolant to the conduits 5 and 16 as well as a device for displacing the stem 5. The conduits 16, which are rigid with a hollow plate 10 and are slidable in the cover 12 as previously described, have inlets 16c connecting with the inner tubes 16a of these conduits while a fitting 16d serves to discharge the fluid passing upwardly through the outer tubes 16b. Similarly, the stem, which is held by a bar 52, has an inlet fitting 53 connecting with tube 43 and an outlet fitting 54 in connection with tube 42. Conventional pumps, heat exchangers or the like complete the coolant circulation system. The slider 6 is raised and lowered by a motor 55 whose output shaft 56 is connected to a threaded spindle 57 which can form a part of the stem 5 in some cases but is here shown to raise and lower a bar 58 connected by tierods with the bar 52.

In the raised position of the slider 6 (FIG. 2), the duct 11 forms a cooled passage between the ports 3a and 3b for the hot gases as represented in FIG. 2. When the slider 6 is lowered, the plates are aligned with the ports and the wedges 7 engage the camming body 8 to deflect the plates 10 outwardly and seal the ports as previously indicated. The plates 10 are continuously cooled to prevent distortion. Since the movement of the cage of slider 6 with respect to the guide plates 4a and 4b occurs without any play therebetween, a self-cleaning of the cage and the plates 10 occurs by sliding action. Furthermore sliding wear of the seats 9 is precluded.

We claim:

1. In a fluid-control valve having a valve body provided with at least one port, a slider shiftable in said valve body and having a valve plate carried thereby for blocking said port in one position of said slider and uncovering said port in another position of said slider, and means for selectively shifting said slider, the improvement wherein said plate is hollow and is provided with at least one rigid conduit extending in the direction of movement of said slider and mounted in said housing for movement with said slider while communicating with the interior of said plate for passing a cooling fluid therethrough.

2. The improvement defined in claim 1 wherein said plate is shiftable transversely to said direction for sealing engagement with said housing around said port in said one position, said conduit being elastically deformable and so mounted in said housing as to permit the movement of said plate transversely to said direction.

3. The improvement defined in claim 2, further comprising cooperating cam means on said plate and said housing and operative upon movement of said slider from said other position to said one position to urge said plate into engagement with said housing around said port.

4. The improvement defined in claim 1 wherein said conduit means is provided with coaxial tubes including an outer tube secured to said plate and an inner tube extending into the interior of said plate beyond the point at which said outer tube is secured thereto and means for feeding a cooling fluid through one of said tubes and leading it from said plate through the other of said tubes.

5. The improvement defined in claim 1 wherein said housing is provided with packing means on said housing sealingly and slidably engaging said conduit.

6. The improvement defined in claim 1, further comprising at least one guide member flanking said port in the direction of movement of said slider and resiliently biased thereagainst.

7. The improvement defined in claim 1 wherein said slider is formed with a cylindrical passage aligned with said port in said other position, means defining a cooling chamber in said slider around said passage, and a further conduit communicating with said slider and mounted in said housing means for movement in said direction.

8. The improvement defined in claim 7, further comprising drive means engageable with said further conduit for shifting said slider.

9. The improvement defined in claim 1, further comprising means forming a cooling-fluid jacket around said port.

10. The improvement defined in claim 1 wherein said housing is generally elongated in said direction and said port opens into said housing transversely to said direction, said housing being provided with a further port opposite said first-mentioned port for the through flow of hot gases in said one position, said slider being formed as a cage shiftable in said direction between said ports and having a pair of hollow closure plates alignable with said ports in said one position and a cylindrical passage communicating between said ports in said other position, means in said cage forming a cooling jacket around said passage, a further conduit rigidly secured to said cage and communicating with said jacket while being mounted in said housing with freedom of sliding movement in said direction for circulating a cooling fluid through said jacket, wedge means carried by said plates, said housing being provided with cam means engageable by said wedge means upon movement of said cage into said one position for biasing said plates outwardly into sealing engagement with said housing around said ports upon movement of said cage into said one position, each of said plates being provided with a respective pair of coaxial tubes for circulating cooling fluid therethrough, said pairs of coaxial tubes extending in said direction and being slidably mounted in said housing with freedom of elastic deflection upon movement of said plates into sealing engagement with said housing around said ports, said housing being formed with a pair of guide plates flanking said ports on opposite sides of said cage and spring-biased into slidable engagement with said cage.

References Cited

UNITED STATES PATENTS

| 3,330,334 | 7/1967 | Jansen et al. | 165—47 |
| 3,292,654 | 12/1966 | Rappold et al. | 137—66 |

ROBERT A. O'LEARY, *Primary Examiner.*

CHARLES SUKALO, *Assistant Examiner.*

U.S. Cl. X.R.

165—138, 186; 137—340